(12) United States Patent
Paek et al.

(10) Patent No.: US 8,379,165 B2
(45) Date of Patent: Feb. 19, 2013

(54) OPTICAL PLATE, BACKLIGHT ASSEMBLY AND DISPLAY DEVICE HAVING THE OPTICAL PLATE

(75) Inventors: Jung-Wook Paek, Suwon-si (KR); Jin-Soo Kim, Seoul (KR); Byung-Yun Joo, Goyang-si (KR); Ju-Hwa Ha, Seoul (KR); Jin-Sung Choi, Cheonan-si (KR); Min-Young Song, Daejeon (KR)

(73) Assignee: Samsung Display Co., Ltd., Yongin, Gyeonggi-do (KR)

( * ) Notice: Subject to any disclaimer, the term of this patent is extended or adjusted under 35 U.S.C. 154(b) by 1980 days.

(21) Appl. No.: 11/438,633

(22) Filed: May 22, 2006

(65) Prior Publication Data

US 2006/0262666 A1    Nov. 23, 2006

(30) Foreign Application Priority Data

May 20, 2005  (KR) .................. 10-2005-0042266
Dec. 21, 2005  (KR) .................. 10-2005-0127158

(51) Int. Cl.
*G02F 1/13357*   (2006.01)
*G09F 13/04*     (2006.01)

(52) U.S. Cl. ............ 349/64; 349/70; 359/599; 362/97.2

(58) Field of Classification Search ............ 349/62, 349/64, 65, 95, 70; 359/599, 619; 362/606, 362/97.2, 97.1, 97.3, 235, 330, 340
See application file for complete search history.

(56) References Cited

U.S. PATENT DOCUMENTS

| | | | |
|---|---|---|---|
| 6,075,649 A * | 6/2000 | Naito | 359/619 |
| 2004/0246697 A1* | 12/2004 | Yamashita et al. | 362/31 |
| 2005/0105283 A1* | 5/2005 | Yamashita et al. | 362/31 |
| 2005/0212989 A1* | 9/2005 | Kashiwagi et al. | 349/56 |

FOREIGN PATENT DOCUMENTS

| | | | |
|---|---|---|---|
| CN | 1397594 A | | 2/2003 |
| JP | 07-239472 | * | 9/1995 |
| JP | 09-159810 | | 6/1997 |
| JP | 09-304605 | | 11/1997 |
| JP | 11-305011 | | 11/1999 |
| JP | 2001-524225 | | 11/2001 |
| JP | 2003-096320 | | 4/2003 |
| JP | 2004-006256 | | 1/2004 |
| KR | 10-2003-0037723 A | | 5/2003 |
| KR | 1020030034333 | | 5/2003 |
| KR | 10-2004-0070717 A | | 8/2004 |
| KR | 1020050038498 | | 4/2005 |
| KR | 10-2005-0069907 A | | 7/2005 |
| WO | 2004017106 A1 | | 2/2004 |

* cited by examiner

*Primary Examiner* — Dung Nguyen
*Assistant Examiner* — Tai Duong
(74) *Attorney, Agent, or Firm* — F. Chau & Associates, LLC

(57) ABSTRACT

An optical plate includes a planar base and a plurality of rounded prisms formed on the planar base. The rounded prisms improve a uniformity of the light passing through the planar base and then irradiate the light having the improved uniformity. A concave peak formed in each of the plurality of rounded prisms of the optical plate scatters the light provided into a rear face of the optical plate so that dark lines and bright lines are not generated on the optical plate. As a result, the optical plate has improved light efficiency.

30 Claims, 18 Drawing Sheets

# OPTICAL PLATE, BACKLIGHT ASSEMBLY AND DISPLAY DEVICE HAVING THE OPTICAL PLATE

CROSS-REFERENCE TO RELATED APPLICATION

This application claims priority under 35 USC §119 to Korean Patent Application Nos. 2005-42266, filed on May 20, 2005, and 2005-127158, filed on Dec. 21, 2005, the contents of which are herein incorporated by reference in their entireties for all purposes.

BACKGROUND OF THE INVENTION

1. Technical Field

The present disclosure relates to an optical plate, a backlight assembly having the optical plate, and a display device having the optical plate. More particularly, the present disclosure relates to an optical plate for improving light efficiency, a backlight assembly having the optical plate, and a display device having the optical plate.

2. Discussion of the Related Art

In general, a backlight assembly employed in a liquid crystal display (LCD) device has an important influence on the brightness, appearance, etc., of the image on the LCD device. The backlight assembly typically includes a lamp assembly, a light-guiding plate or a diffusion plate assembly, a housing unit, etc.

Particularly, a backlight assembly employed in an LCD TV has a structure that includes a diffusion plate, a diffusion sheet and a luminance-enhancing sheet that are sequentially stacked. Since light passes through various media, which have different refractive indexes, in the structure of the backlight assembly, a transfer of energy occurs so that a large amount of the light produced by the lamp of the lamp assembly is lost.

Moreover, since many optical sheets are used in the structure and mounting treatment of the optical sheets becomes very difficult. Further, the cost of manufacturing the complicated backlight assembly is increased.

FIG. 1 is a cross sectional view illustrating light paths in a backlight assembly having a conventional diffusion plate.

Referring to FIG. 1, a conventional diffusion plate 2 is arranged over a plurality of lamps 4 that are arranged in parallel. The diffusion plate 2 diffuses light emitted from the lamps 4 and light reflected from a reflection plate 6. The diffusion plate 2 then irradiates the light in an upward direction. Here, bright lines and dark lines may be generated in a surface portion of the diffusion plate 2 corresponding to the lamps 4. Particularly, the bright lines are generated in regions I of the diffusion plate 2 relatively adjacent to the lamps 4. In contrast, the dark lines are generated in regions II of the diffusion plate 2 relatively distant from the lamps 4.

The bright lines and the dark lines may vary in accordance with a thickness and efficiency of the diffusion plate 2. That is, light transmissivity of the diffusion plate 2 is improved and luminance uniformity of the diffusion plate 2 is decreased in proportion to reducing the thickness of the diffusion plate 2. In contrast, the light transmissivity of the diffusion plate 2 is decreased and the luminance uniformity of the diffusion plate 2 is improved in proportion to increasing the thickness of the diffusion plate 2. These are caused by an increase of diffusion distribution and by an increase of light loss of the lamp in proportion to a scattering of the light paths.

To remove the bright lines and the dark lines, optical sheets are arranged over the diffusion plate or the space between the lamp and the diffusion plate is widened. However, the arrangement of the optical sheets and the widening of the spacing cause an increase in a thickness of an LCD module. Thus, one or two additional diffusion sheets are arranged to remove the bright lines and the dark lines. However, the additional diffusion sheets cause an increase in the costs of manufacturing the backlight assembly.

Further, the light efficiency of the conventional backlight assembly may be reduced in proportion to an increase of the light loss.

SUMMARY OF THE INVENTION

The embodiments of the present invention provide an optical plate that includes prisms for suppressing generation of bright lines and dark lines and for improving light efficiency a backlight assembly having the optical plate including prisms, and a display device having the optical plate including prisms.

An optical plate in accordance with an embodiment of the present invention includes a planar base and a plurality of rounded prisms formed on the planar base. The rounded prisms improve the uniformity of light passing through the planar base and then irradiate the light having the improved uniformity.

A backlight assembly in accordance with an embodiment of the present invention includes a light source unit and an optical plate. The light source unit emits a light. The optical plate for improving uniformity of the light includes a planar base and a plurality of rounded prisms formed on the planar base.

A display device in accordance with an embodiment of the present invention includes a display panel, a light source unit and an optical plate. The display panel displays an image using light from the light source unit. The light source unit is positioned under the display panel so as to emit the light. The optical plate for improving uniformity of the light includes a planar base and a plurality of rounded prisms formed on the planar base.

According to embodiments of the present invention, the prisms having concave peaks, which are formed on a light-exiting face of the optical plate, scatter the light that is provided into a rear face of the optical plate so that dark lines and bright lines may not be generated on the optical plate. As a result, the optical plate, the backlight assembly and the display device may have improved light efficiency.

BRIEF DESCRIPTION OF THE DRAWINGS

Exemplary embodiments of the present invention can be understood in more detail from the following descriptions taken in conjunction with the accompanying drawings, in which.

DESCRIPTION OF THE EXEMPLARY EMBODIMENTS

Exemplary embodiments of the present invention are described more fully hereinafter with reference to the accompanying drawings. This invention may, however, be embodied in many different forms and should not be construed as limited to the embodiments set forth herein.

Figure 1:
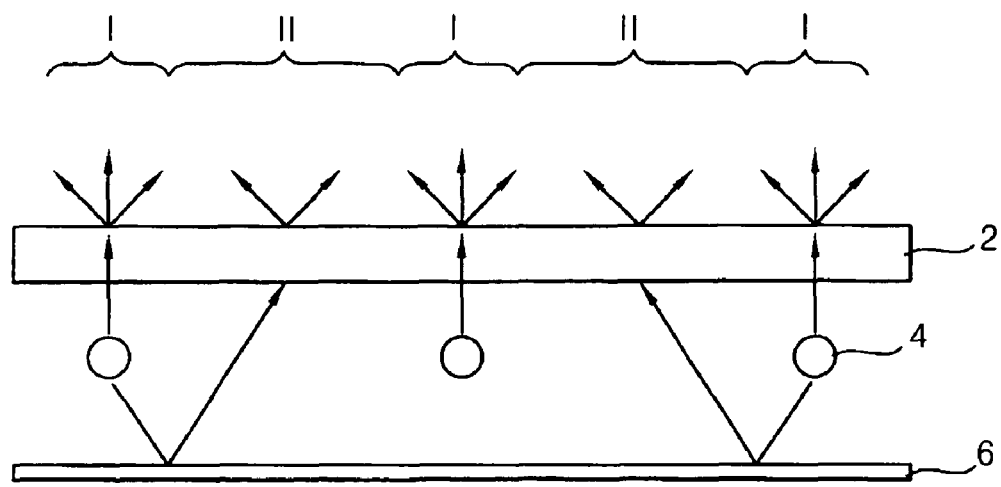
FIG. 1 is a cross sectional view illustrating light paths in a backlight assembly having a conventional diffusion plate.
Figure 2:
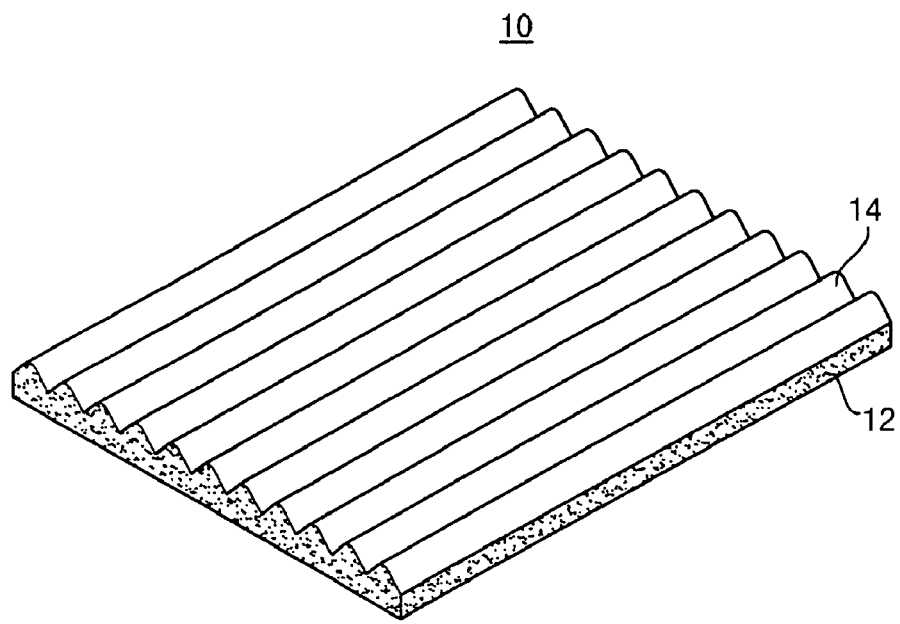
FIG. 2 is a perspective view illustrating an optical plate in accordance with one exemplary embodiment of the present invention.
Figure 3:
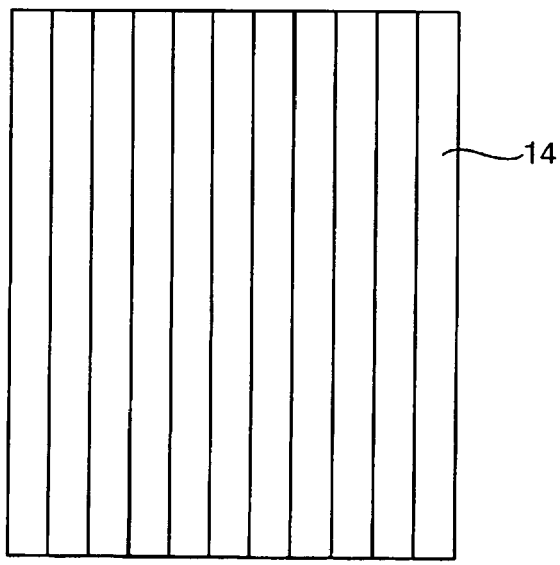
FIG. 3 is a plan view illustrating the optical plate shown in FIG. 2.
Figure 4:
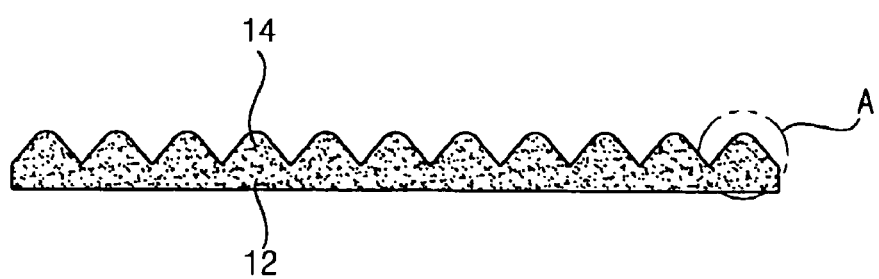
FIG. 4 is a cross sectional view illustrating the optical plate shown in FIG. 2.
Figure 5:
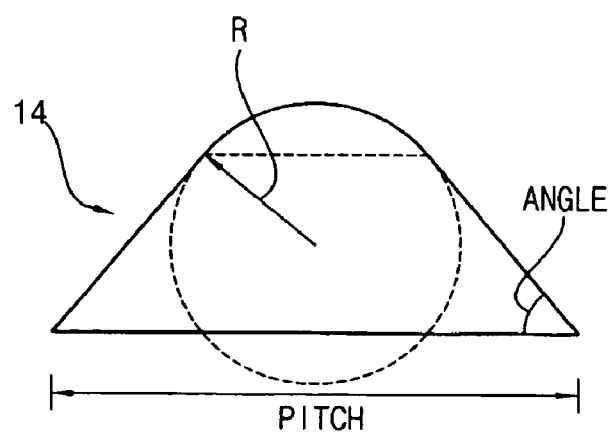
FIG. 5 is a cross sectional view illustrating one rounded prism of the optical plate shown in FIG. 2.

FIG. 2 is a perspective view illustrating an optical plate in accordance with an exemplary embodiment of the present invention, FIG. 3 is a plan view illustrating the optical plate in FIG. 2, FIG. 4 is a cross sectional view illustrating the optical plate in FIG. 2, and FIG. 5 is a cross sectional view illustrating a single rounded prism of the optical plate in FIG. 2.

Referring to FIGS. 2 to 5, an optical plate 10 of an exemplary embodiment of the present invention includes a planar base 12 and a lens 14.

The planar base 12 includes a transparent plastic plate having a thickness of about 1 mm to about 2 mm. An example of the plastic plate includes a material having a high refractive index such as polycarbonate-series resin (PC), polymethylmethacrylate-series resin (PMMA), methacrylate-styrene copolymer (MS), etc.

The lens 14 includes a plurality of prisms each having a rounded peak. A ratio between a pitch (or a length of a bottom side) and a radius of curvature in the rounded peak of the prism may be about 100:30 to about 100:38. Preferably, a ratio between the length of the bottom line and the radius of the curvature in the rounded peak of the prism may be about 100:34.

The pitch of the prism may be about 50 µm to about 200 µm. The radius of the curvature in the rounded peak of the prism may be about 15 µm to about 76 µm. For example, when the pitch of the prism is 50 µm, the radius of the curvature in the rounded peak of the prism is about 15 µm. Alternatively, when the pitch of the prism is 200 µm, the radius of the curvature in the rounded peak of the prism may be about 76 µm.

Further, the prism has an inclined angle of about 43° to about 47°. The prism has a height of about 50 µm. The rounded prisms are closely arranged.

In addition, an ultraviolet (UV)-blocking layer (not shown) may be formed on a bottom face of the planar base 12. The UV-blocking layer blocks light having a relatively high-energy wavelength from among all of the light to be provided into the bottom face of the planar base 12, in order to prevent light having the relatively high-energy wavelength from being irradiated into the planar base 12. Particularly, when the planar base 12 is formed of polycarbonate-series resin (PC), the UV-blocking layer is necessarily formed.

Further, ultraviolet (UV)-blocking particles (not shown) may be formed on the bottom face of the planar base 12. The UV-blocking particles block the light having the relatively high energy in order to prevent the light having the relatively high-energy wavelength from being irradiated into the planar base 12.

Figure 6:
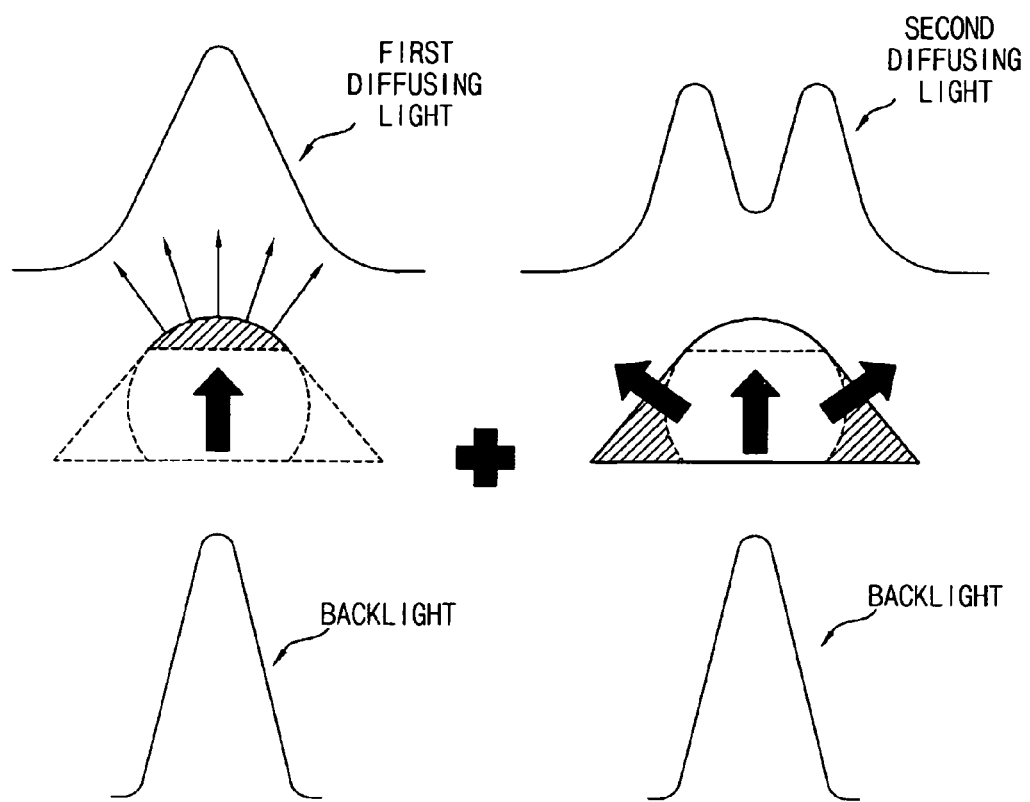
FIG. 6 is a cross sectional view illustrating optical effects exhibited by the rounded prism shown in FIG. 5.

FIG. 6 is a cross sectional view illustrating optical effects exhibited by the rounded prism in FIG. 5.

Referring to FIG. 6, after a backlight having a pulse is irradiated into a rounded face or an upper circular face of the prism, the backlight diffuses through the rounded peak to generate a first diffusing light. The first diffusing light has a single peak value lower than that of the backlight pulse. However, since a distance between the peak of the prism and a light source is relatively short, desired light-diffusing effects, which mean that bright lines and dark lines of the light source do not appear, may not be obtained using only an upper circular structure of the prism.

After the backlight is irradiated into an inclined face or trapezoidal face of the prism, the backlight diffuses through the inclined faces of the prism to generate a second diffusing light. The second diffusing light has two peak values lower than those of the backlight pulse and the first diffusing light. However, since the backlight diffuses in two directions due to the inclined faces of the prism, the bright lines and the dark lines may be generated in the optical plate 10.

As described above, the inclined faces of the prism compensate for the above-mentioned shortcoming caused by the rounded peak of the prism. Further, the rounded peak of the prism compensates for the above-mentioned shortcoming caused by the inclined faces of the prism.

Figure 7:
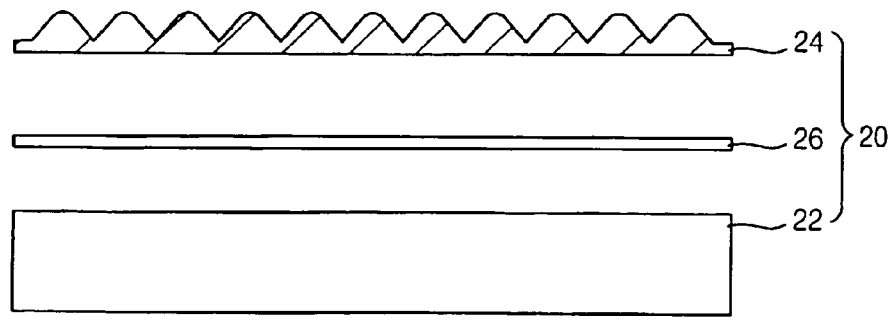
FIG. 7 is a cross sectional view illustrating an optical plate in accordance with an exemplary embodiment of the present invention.

FIG. 7 is a cross sectional view illustrating an optical plate in accordance with an embodiment of the present invention.

Referring to FIG. 7, an optical plate 20 of this embodiment includes a planar base 22, a lens array sheet 24 having a plurality of rounded prisms, and an adhesive member 26 for physically attaching the lens array sheet 24 to the planar base 22.

The planar base 22 includes a transparent plastic plate having a thickness of about 1 mm to about 2 mm. An example of the plastic plate includes a material having a high refractive index such as polycarbonate-series resin (PC), polymethylmethacrylate-series resin (PMMA), methacrylate-styrene copolymer (MS), etc.

The lens array sheet 24 includes a plurality of the prisms having the rounded peak. The rounded prisms are substantially the same as those in FIG. 5. That is, a ratio between a length of a bottom side and a radius of curvature in the rounded peak of the prism may be about 100:30 to about 100:38. Preferably, a ratio between the length of the bottom line and the radius of the curvature in the rounded peak of the prism may be about 100:34.

The adhesive member 26 may be a hardened adhesive, a double-sided adhesive tape, etc.

In this embodiment, the adhesive member 26 is interposed between the planar base 22 and the lens array sheet 24, as shown in FIG. 7. Alternatively, the adhesive member 26 may be omitted.

In addition, an ultraviolet (UV)-blocking layer (not shown) may be formed on a bottom face of the planar base 22. The UV-blocking layer blocks light having a relatively high-energy wavelength from among all of the light to be provided into the bottom face of the planar base 22, to prevent the light having the relatively high-energy wavelength from being irradiated into the planar base 22.

Further, ultraviolet (UV)-blocking particles (not shown) may be formed on the bottom face of the planar base 22. The UV-blocking particles block the light having the relatively high energy to prevent the light having the relatively high-energy wavelength from being irradiated into the planar base 22.

Hereinafter, a method of manufacturing the optical plate having the rounded prism array is illustrated in detail.

FIGS. 8A to 8E are cross sectional views illustrating a method of manufacturing the optical plate in FIG. 2.

Figure 8A:
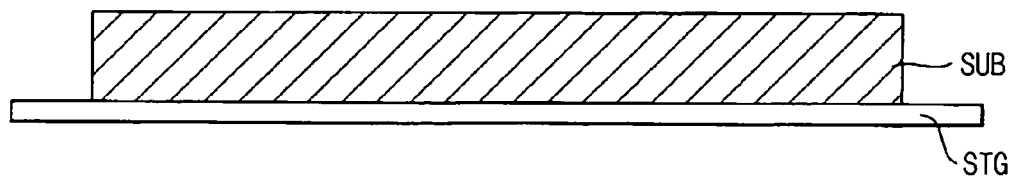
FIGS. 8A to 8E are cross sectional views illustrating a method of manufacturing the optical plate shown in FIG. 2.

Referring to FIG. 8A, a base substrate SUB having a thickness of about 1 mm is placed on a stage STG. An example of the base substrate SUB includes a metal such as pure copper, brass, aluminum, nickel, etc. A surface of the base substrate SUB is treated using a flat diamond tool.

Figure 8B:
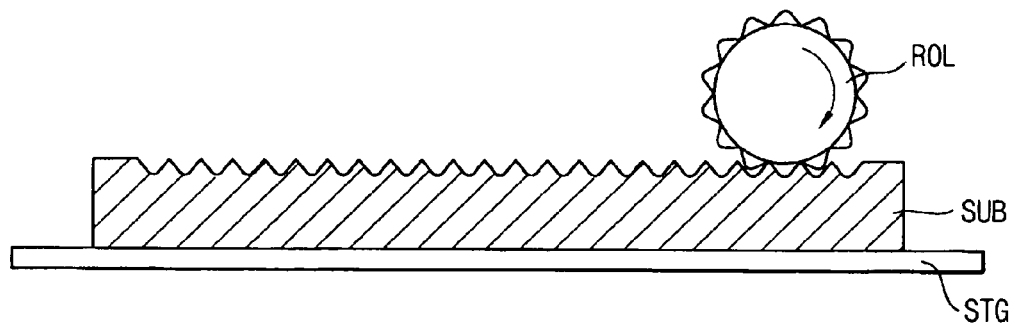

Referring to FIG. 8B, a roller ROL having teeth is rotated along the treated surface of the base substrate SUB with the teeth pressing the surface of the base substrate SUB to form grooves at the surface of the base substrate SUB. Here, protruded portions between the grooves extend in an axial direction of the roller ROL. A pitch, an inclined angle and a radius of curvature of the protruded portion are substantially the same as those in FIG. 5. Alternatively, a diamond bit may be used for forming the grooves in place of the roller ROL. The grooves define the rounded prism of the optical plate having the rounded prism array shape.

Figure 8C:
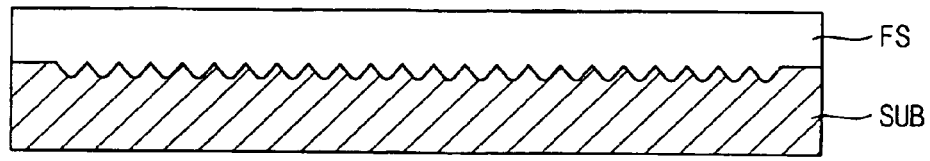

Referring to FIG. 8C, a melted metal layer (not shown) is coated on the surface of the base substrate SUB. The melted metal layer is then coagulated by a cast-iron process to form a father stamper (FS). The father stamper FS has a shape substantially reverse to that of the base substrate SUB having the grooves.

Figure 8D:
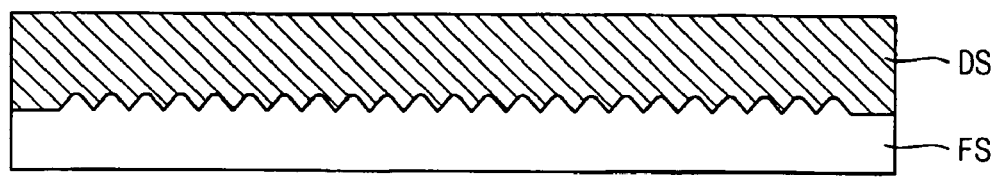

Referring to FIG. 8D, a melted metal layer (not shown) is coated on the father stamper FS. The melted metal layer is then coagulated by a cast-iron process to form a daughter stamper DS having a shape reverse to that of the father stamper FS. Here, in manufacturing the stampers for forming the optical plate having the rounded prism array shape, to manufacture a plurality of the optical plates using the stampers, the optical plates may be manufactured using the stampers by a single process.

Here, when the stampers are manufactured using the base substrate SUB, portions of the base substrate SUB that make contact with the stamper are worn so that the optical plate formed using the worn base substrate may have an undesired shape. Thus, in this embodiment, the daughter stampers are manufactured using the father stamper. The optical plate having the rounded prism array shape is then manufactured using the daughter stampers.

As described above, to manufacture the optical plate using the two stampers, it is necessary that the father stamper FS have a shape substantially identical to that of the optical plate and the base substrate SUB has a shape substantially identical to that of the daughter stamper DS. Therefore, the shape of the father stamper FS is reverse to that of the optical plate.

Figure 8E:
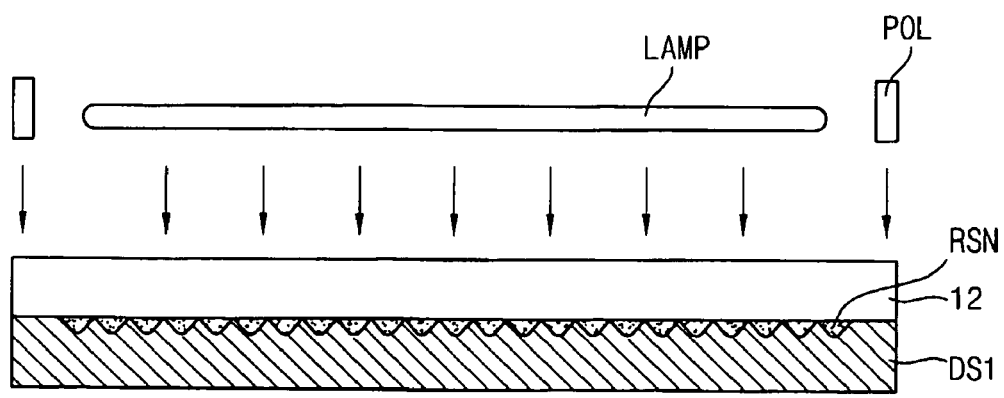

Referring to FIG. 8E, the grooves of the daughter stamper DS are filled with a UV-hardening resin RSN. The planar base 12 is placed on the daughter stamper DS. Here, the UV-hardening resin RSN may have a refractive index substantially the same as that of the planar base 12.

A UV ray is irradiated onto the planar base 12 with poles POL compressing an edge portion of the planar base 12 to attach the UV-hardening resin RSN to the planar base 12, thereby completing the optical plate having the rounded prism array shown in FIGS. 2 to 5.

Figure 9:
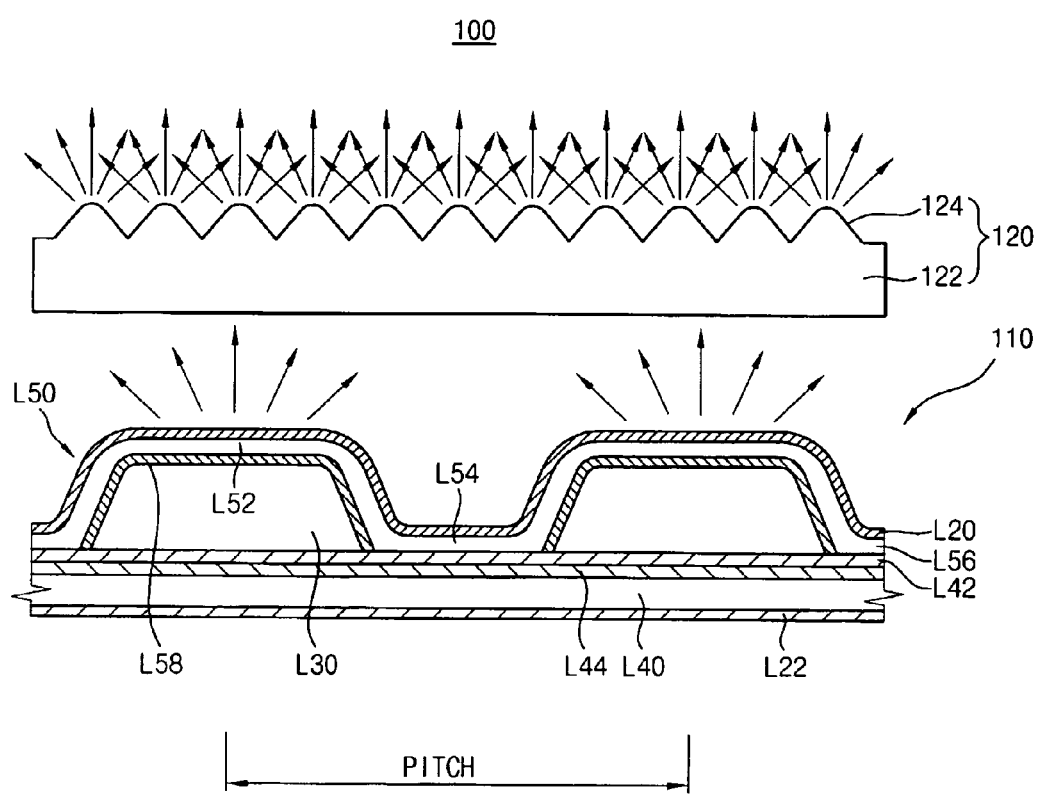
FIG. 9 is a cross sectional view illustrating a backlight assembly in accordance with an exemplary embodiment of the present invention.

FIG. 9 is a cross sectional view illustrating a backlight assembly in accordance with an embodiment of the present invention.

Referring to FIG. 9, a backlight assembly 100 of this embodiment includes a flat fluorescent lamp 110 for emitting a light, and an optical plate 120 arranged over the flat fluorescent lamp 110, to improve uniformity of the light emitted from the flat fluorescent lamp 110 and to then irradiate the light in an upward direction. As shown in FIGS. 2 to 5, the optical plate 120 includes a planar base 120, and rounded prisms 124 formed on the planar base 120. The optical plate 120 has a heat-resistant property.

The flat fluorescent lamp 110 includes a lamp body having a first outer electrode L20. The lamp body has a plurality of discharge spaces L30 that are continuously arranged in parallel with each other on a substantially the same plane in view of a cross section.

The first outer electrode L20 is formed as an outer face of the lamp body. The first outer electrode L20 is positioned on both ends of the discharge spaces L30 in a lengthwise direction of the discharge spaces L30 so that the first outer electrode L20 is intersected with the discharge spaces L30.

The lamp body also includes a rear substrate L40, and a front substrate L50 combined with the rear substrate L40 to form the discharge spaces L30. The rear substrate L40 has a rectangular flat plate shape. For example, the rear substrate L40 includes a transparent glass substrate that is capable of allowing a visible light to pass through the glass substrate, and blocking a UV ray through the glass substrate. The front substrate L50 is assembled with the rear substrate L40 to form the discharge spaces L30. For example, the front substrate L50 may include a transparent glass substrate substantially the same as that of the rear substrate L40.

The front substrate L50 includes a plurality of discharge space portions L52 spaced apart from the rear substrate L40 to form the discharge spaces L30, a plurality of space-dividing portions L54 connected between the adjacent discharge space portions L52 and making contact with the rear substrate L40, and a sealing portion L56 formed between the discharge space portions L52 and an edge of the space-dividing portions L54 and combined with the rear substrate L40.

Various kinds of discharge gases for plasma discharging are injected into the discharge spaces L30. Examples of the discharge gases include mercury (Hg), neon (Ne), argon (Ar), xenon (Xe), krypton (Kr), etc. A gas pressure of the discharge gases in the discharge spaces L30 is about 50 torr. Thus, a pressure difference between the gas pressure and an atmospheric pressure of about 760 torr is generated. The pressure difference generates a force applied to an inner space of the lamp body from an exterior of the lamp body so that the space-dividing portions L54 make close contact with the rear substrate L40 due to the force.

The lamp body further includes a reflection layer L44 formed on the rear substrate L40, a first fluorescent layer L42 formed on the reflection layer L44, and a second fluorescent layer L58 formed beneath the front substrate L50. A UV ray generated by the plasma discharging excites the first and second fluorescent layers L42 and L58 to emit a visible light. The reflection layer L44 reflects the light generated from the first and second fluorescent layers L42 and L58 toward the front substrate L50 to prevent the light from leaking through the rear substrate L40.

The first outer electrode L20 is formed on the outer face of the front substrate L50. The first outer electrode L20 is arranged on both ends of the front substrate L50 in a direction substantially perpendicular to a lengthwise direction of the discharge space portions L52. Thus, the first outer electrode L20 is overlapped with the ends of all of the discharge spaces L30.

A relatively large amount of light is emitted in a region where the discharge spaces L30 are positioned. In contrast, a relatively small amount of light is emitted in a region where the discharge spaces L30 are not positioned. As a result, the bright lines are generated in the region where the relatively large amount of light is emitted. On the other hand, the dark fields are generated in the region where the relatively small amount of light is emitted.

However, the rounded prisms of the optical plate 120 in accordance with the present invention enhance the diffusion of the light. As a result, the generation of the bright lines and the dark fields on the optical plate 120 may be suppressed. Further, a luminance difference between the bright lines and the dark fields may be reduced.

In this embodiment, the optical plate having the rounded prism array shape is employed in the backlight assembly having the flat fluorescent lamp. Alternatively, it will be apparent to persons of ordinary skill in the art that the optical plate having the rounded prism array shape may be employed in a direct illumination type backlight assembly, a backlight assembly having a plurality of light-emitting diodes, etc.

Figure 10:
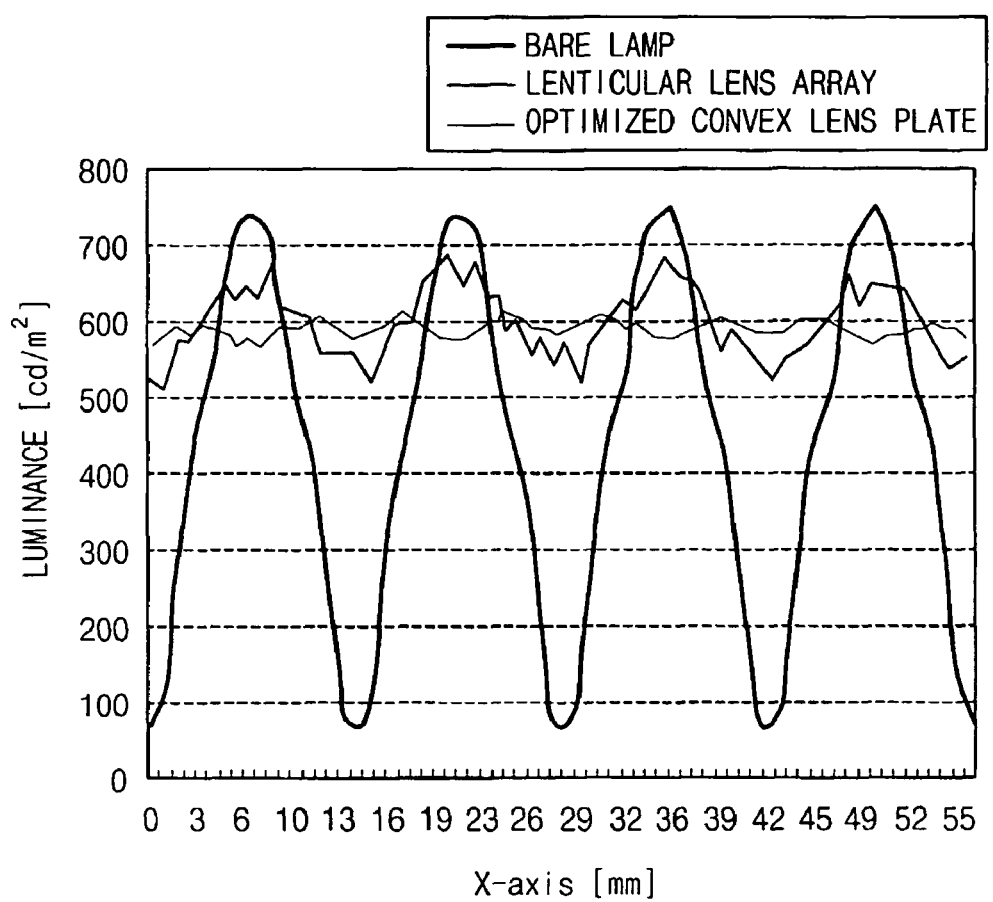
FIG. 10 is a graph illustrating optically analyzed results obtained by applying the optical plate having the rounded prism arrays to a flat fluorescent lamp.

FIG. 10 is a graph illustrating optically analyzed results obtained by applying the optical plate having the rounded prism array to a flat fluorescent lamp.

Referring to FIG. 10, a lenticular lens array type general optical plate diffuses a backlight having a luminance of about 80 cd/m$^2$ to about 750 cd/m$^2$ to provide the backlight with a luminance of about 520 cd/m$^2$ to about 680 cd/m$^2$. The lenticular lens array type optical plate is proposed for reducing the thickness of a backlight assembly. Each lenticular lens has a semi-circular shape protruded toward a viewer to diffuse an image, thereby providing the viewer with a viewing angle of about 180° centering around a screen.

In contrast, the optical plate having the rounded prism array shape diffuses a backlight having a luminance of about 80 cd/m$^2$ to about 750 cd/m$^2$ to provide the backlight with a luminance of about 580 cd/m$^2$ to about 610 cd/m$^2$.

Therefore, the optical plate having the rounded prism array shape may have improved light-diffusing efficiency, that is better than that of the lenticular lens array type optical plate.

Figure 11:
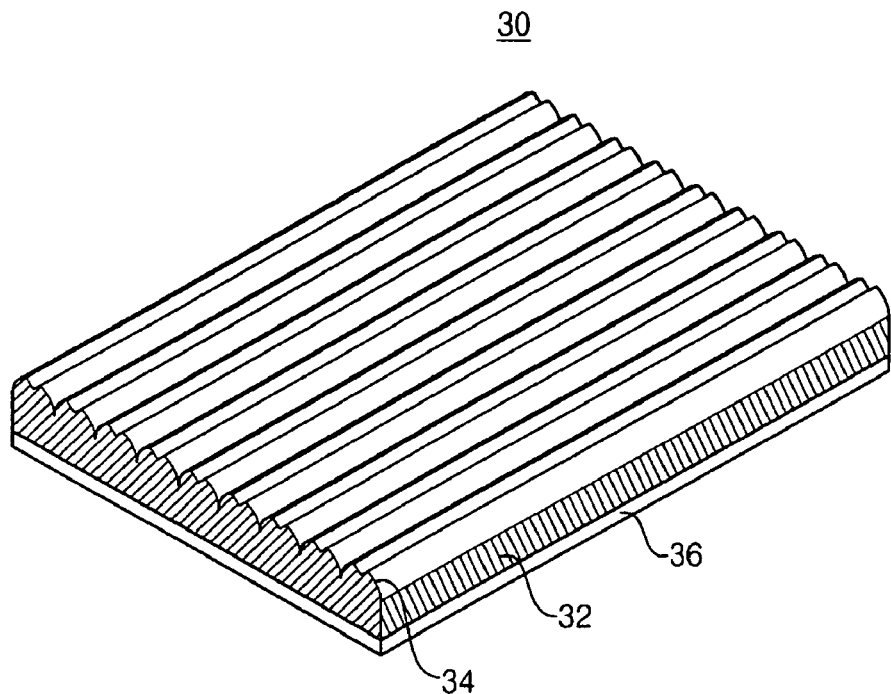
FIG. 11 is a perspective view illustrating an optical plate in accordance with an exemplary embodiment of the present invention.
Figure 12:
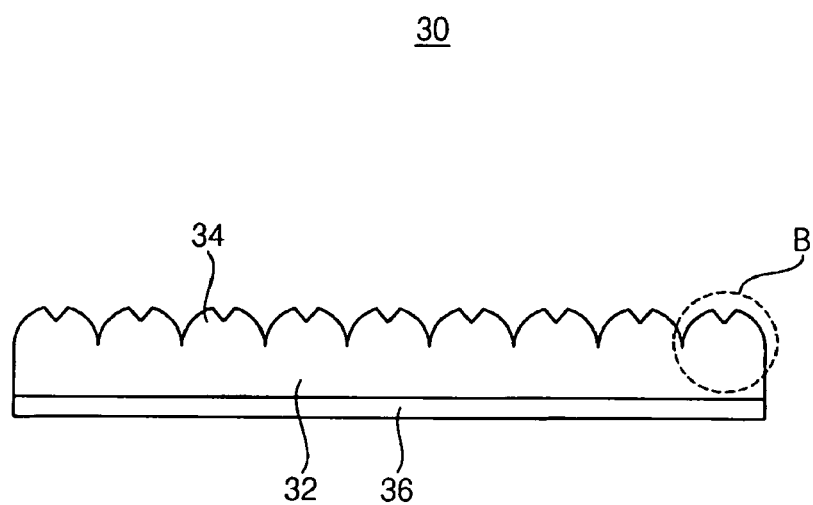
FIG. 12 is a cross sectional view illustrating the optical plate shown in FIG. 11.
Figure 13:
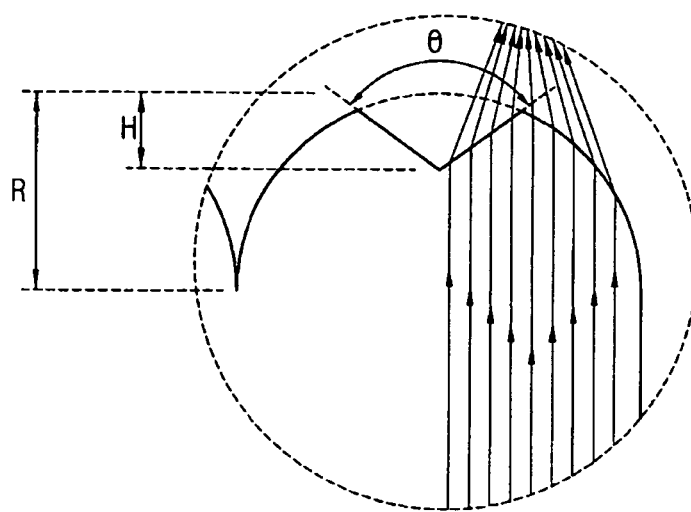
FIG. 13 is an enlarged cross sectional view of a portion 'B' in FIG. 12 that illustrates light-diffusing operations of the unit prism.

FIG. 11 is a perspective view illustrating an optical plate in accordance with an embodiment of the present invention, FIG. 12 is a cross sectional view illustrating the optical plate in FIG. 11, and FIG. 13 is an enlarged cross sectional view of a portion 'B' in FIG. 12 that illustrates light-diffusing operations of one prism of the array.

Referring to FIGS. 11 to 13, an optical plate 30 of this embodiment includes a planar base 32, a lens 34 and a UV-blocking layer 36.

The planar base 32 includes a transparent plastic plate having a thickness of about 1 mm to about 2 mm. An example of the plastic plate includes a material having a high refractive index such as polycarbonate-series resin (PC), polymethyl-methacrylate-series resin (PMMA), methacrylate-styrene copolymer (MS), etc.

The lens 34 includes a plurality of prisms having a concave portion that is formed at a peak of each of the prisms. The prisms may be closely arranged. A pitch between the prisms is about 50 μm to about 300 μm. The prisms are defined by two inclined portions (or inclined curved faces). Further, the concave portion is defined by two planes. Furthermore, the two inclined portions define a circular portion. The circular portion has a radius R of about 25 μm to about 150 μm. The concave portion has an interior angle θ of about 60° to about 160°. The concave portion has a depth H of about 0.1 R to about 0.7 R. That is, when the radius of the concave portion is 25 μm, the depth of the concave portion is about 2.5 μm to about 1.75 μm. On the contrary, when the radius of the concave portion is 150 μm, the depth of the concave portion is about 15 μm to about 105 μm.

When an interval between the optical plate 30 and a light source for providing a light to the optical plate 30 is about 6.5 mm, the interior angle θ and the depth H of the concave portion is about 112° and about 0.2 R, respectively.

It is preferable that the prisms are densely formed.

The UV-blocking layer 36 is formed on a bottom face of the planar base 32. The UV-blocking layer 36 blocks light having a relatively high-energy wavelength among all of the light to be provided into the bottom face of the planar base 32, to prevent the light having the relatively high-energy wavelength from being irradiated into the planar base 32. Particularly, when the planar base 32 includes polycarbonate-series resin (PC), the UV-blocking layer 36 is necessarily formed.

Referring to FIG. 13, a path of backlight incident to the concave portion is directed to an outer region of each prism. In contrast, another path of another backlight incident to the inclined portion is directed to a central region of each prism.

Figure 14:
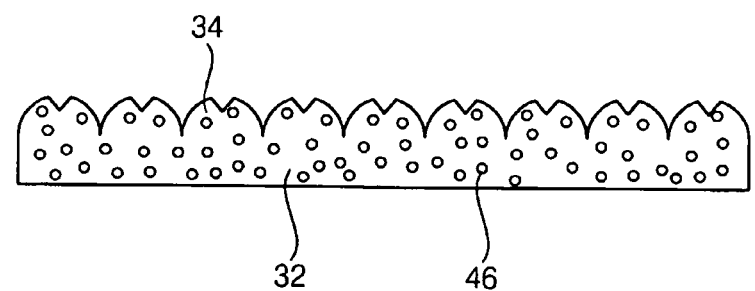
FIG. 14 is a cross sectional view illustrating an optical plate in accordance with an exemplary embodiment of the present invention.

FIG. 14 is a cross sectional view illustrating an optical plate in accordance with an embodiment of the present invention. The optical plate of the present embodiment includes elements substantially the same as those in FIGS. 11 and 12 except for scattering particles. Thus, the same reference numerals refer to the same elements and any further illustrations with respect to the same elements are omitted herein for brevity.

Referring to FIG. 14, an optical plate 40 of this embodiment includes a planar base 32, a lens 34 and scattering particles 46.

The scattering particles 46 are formed in the planar base 32 and the lens 34. Alternatively, the scattering particles may be formed in either the planar base 32 or the lens 34.

The optical plate 40 may further include UV-blocking particles (not shown) formed on a bottom face of the planar base 32. The UV-blocking particles block light having a relatively high-energy wavelength among all of the light to be provided into the bottom face of the planar base 32, to prevent the light having the relatively high-energy wavelength from being irradiated into the planar base 32.

In this embodiment, an intersection region between the inclined portion and the concave portion of the prism in FIG. 14 has a wedge shape. Alternatively, to readily form the prism, the intersection region between the inclined portion and the concave portion of the prism may have a rounded shape.

Figure 15:
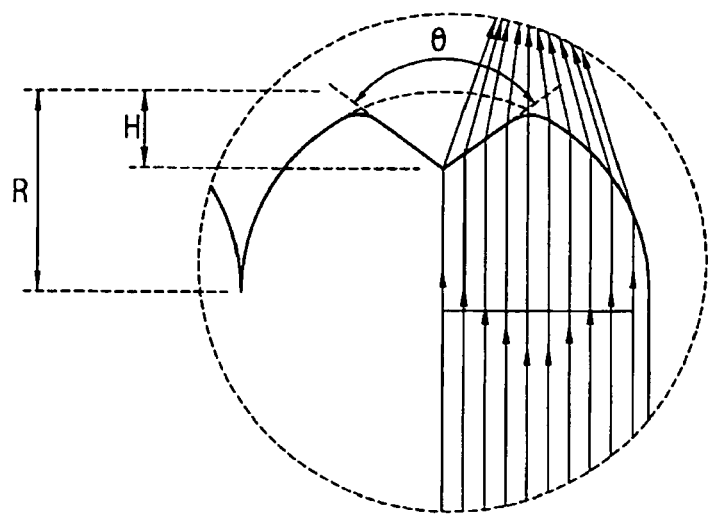
FIG. 15 is a cross sectional view illustrating light-diffusing operations of one prism in the optical plate of FIG. 14.

FIG. 15 is a cross sectional view illustrating light-diffusing operations of one prism in the optical plate of FIG. 14.

Referring to FIG. 15, a path of backlight incident to the concave portion is directed to an outer region of a prism. In contrast, a path of a backlight incident to the inclined portion is directed to a central region of the prism. Further, a path of a backlight incident to the intersection region between the inclined portion and the concave portion of the prism is directed to the outer region or the central region of the prism.

Figure 16:
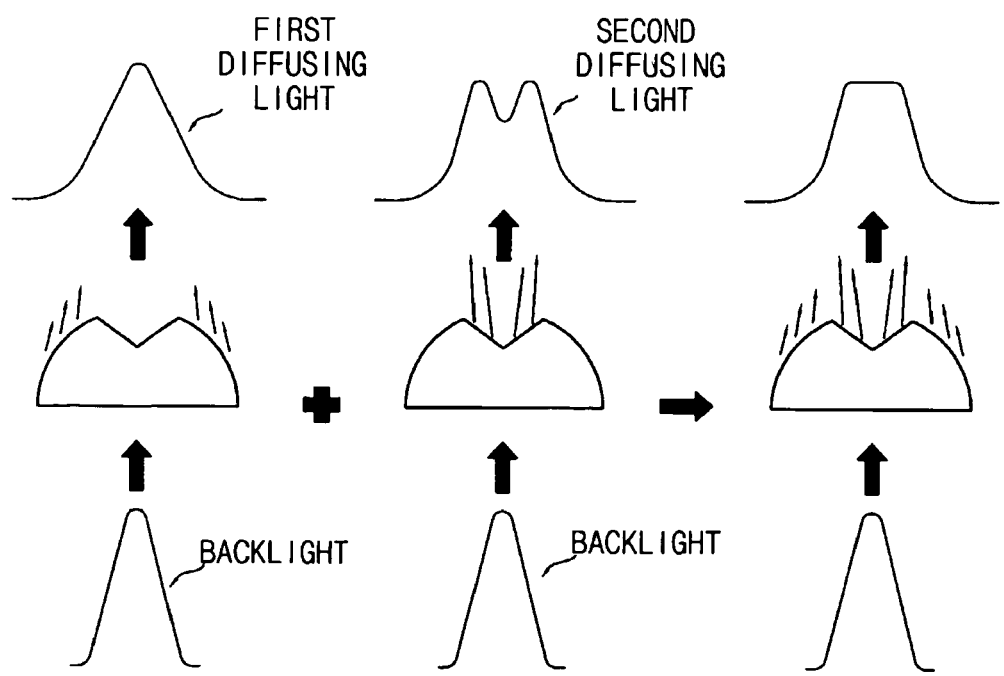
FIG. 16 a cross sectional view illustrating optical effects exhibited by a rounded prism of the optical plate shown in FIG. 11.

FIG. 16 a cross sectional view illustrating optical effects exhibited by a rounded prism of the optical plate in FIG. 11.

Referring to FIG. 16, after a backlight having a pulse is irradiated into an inclined portion of the prism, the backlight diffuses through the inclined portion to generate a first diffusing light. The first diffusing light has a single peak value lower than that of the backlight pulse. However, since a distance between the inclined portion of the prism and the light source is relatively shorter than that between the peak of the prism and the light source, desired light-diffusing effects, which mean that bright lines and dark lines of the light source do not appear, may not be obtained using only the inclined structure of the prism.

After the backlight is irradiated into the concave portion of the prism, the backlight diffuses through the concave portion of the prism to generate a second diffusing light. The second diffusing light has two peak values lower than those of the backlight pulse and the first diffusing light. However, since the backlight diffuses in two directions due to the peak of the prism, the bright lines and the dark lines may be generated in the optical plate.

Thus, when the light incident to the inclined portion of the prism and the light incident to the concave portion of the prism are overlapped, a desired light having broad luminance distribution may be obtained.

As described above, the inclined face of the prism compensates for the above-mentioned shortcoming caused by the concave portion of the prism. Further, the concave portion of the prism compensates for the above-mentioned shortcoming caused by the inclined face of the prism.

Hereinafter, a method of manufacturing the optical plate having the rounded prism is illustrated in detail.

FIGS. 17A to 17E are cross sectional views illustrating a method of manufacturing the optical plate shown in FIG. 11.

Figure 17A:
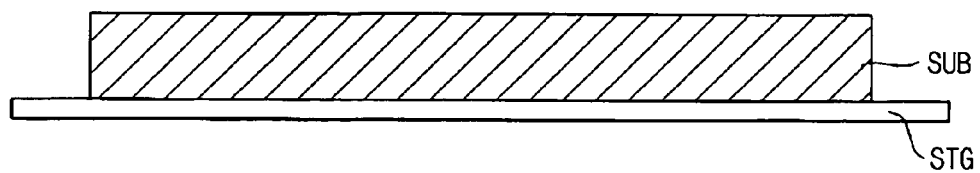
FIGS. 17A to 17E are cross sectional views illustrating a method of manufacturing the optical plate shown in FIG. 11.

Referring to FIG. 17A, a base substrate SUB having a thickness of about 1 mm is placed on a stage STG. An example of the base substrate SUB includes a metal such as pure copper, brass, aluminum, nickel, etc. A surface of the base substrate SUB is treated using a flat diamond tool.

Figure 17B:
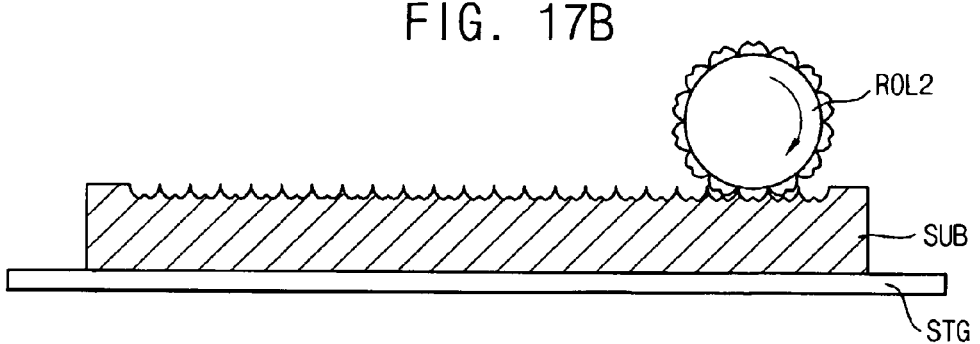

Referring to FIG. 17B, a roller ROL having teeth is rotated along the treated surface of the base substrate SUB with the teeth pressing the surface of the base substrate SUB to form grooves at the surface of the base substrate SUB. Here, protruded portions between the grooves extend in an axial direction of the roller ROL. A pitch, a height and a radius of the protruded portion and a depth of a concave portion are substantially the same as those in FIGS. 11 to 13. Alternatively, a diamond bit may be used for forming the grooves in place of the roller ROL. The grooves define the rounded prism of the optical plate having the rounded prism array shape.

Figure 17C:
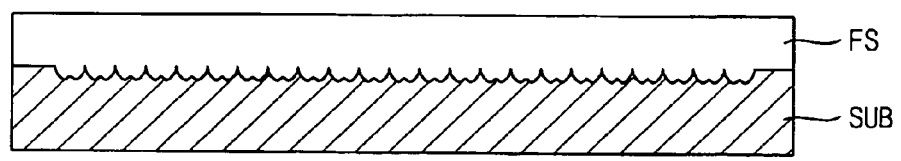

Referring to FIG. 17C, a melted metal layer (not shown) is coated on the surface of the base substrate SUB. The melted metal layer is then coagulated by a cast-iron process to form a father stamper (FS). The father stamper FS has a shape substantially reverse to that of the base substrate SUB having the grooves.

Figure 17D:
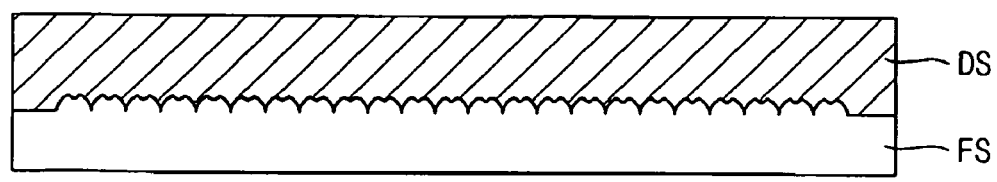

Referring to FIG. 17D, a melted metal layer (not shown) is coated on the father stamper FS. The melted metal layer is then coagulated by a cast-iron process to form a daughter stamper DS having a shape reverse to that of the father stamper FS. Here, in manufacturing the stampers for forming the optical plate that includes the prisms having the concave peak, to manufacture a plurality of the optical plates using the stampers, the optical plates may be manufactured using the stampers by a single process.

Here, when the stampers are manufactured using the base substrate SUB, portions of the base substrate SUB that make contact with the stamper are worn so that the optical plate formed using the worn base substrate may have an undesired shape. Thus, in this embodiment, the daughter stampers are manufactured using the father stamper. The optical plate having the rounded prism array shape is then manufactured using the daughter stampers.

As described above, to manufacture the optical plate using the two stampers, it is necessary that the father stamper FS have a shape substantially identical to that of the optical plate and the base substrate SUB has a shape substantially identical to that of the daughter stamper DS. Therefore, the shape of the father stamper FS is reverse to that of the optical plate.

Figure 17E:
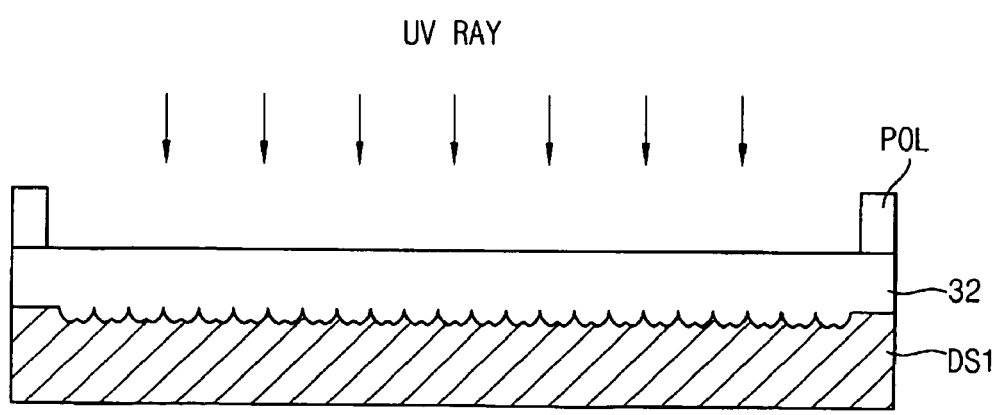

Referring to FIG. 17E, the grooves of the daughter stamper DS are filled with a UV-hardening resin RSN. The planar base 32 is placed on the daughter stamper DS. Here, the UV-hardening resin RSN may have a refractive index substantially the same as that of the planar base 32.

A UV ray is irradiated onto the planar base 32 with poles POL compressing an edge portion of the planar base 32 to attach the UV-hardening resin RSN to the planar base 32, thereby completing the optical plate that includes the prisms having the concave peak in FIGS. 11 to 13.

Figure 18:
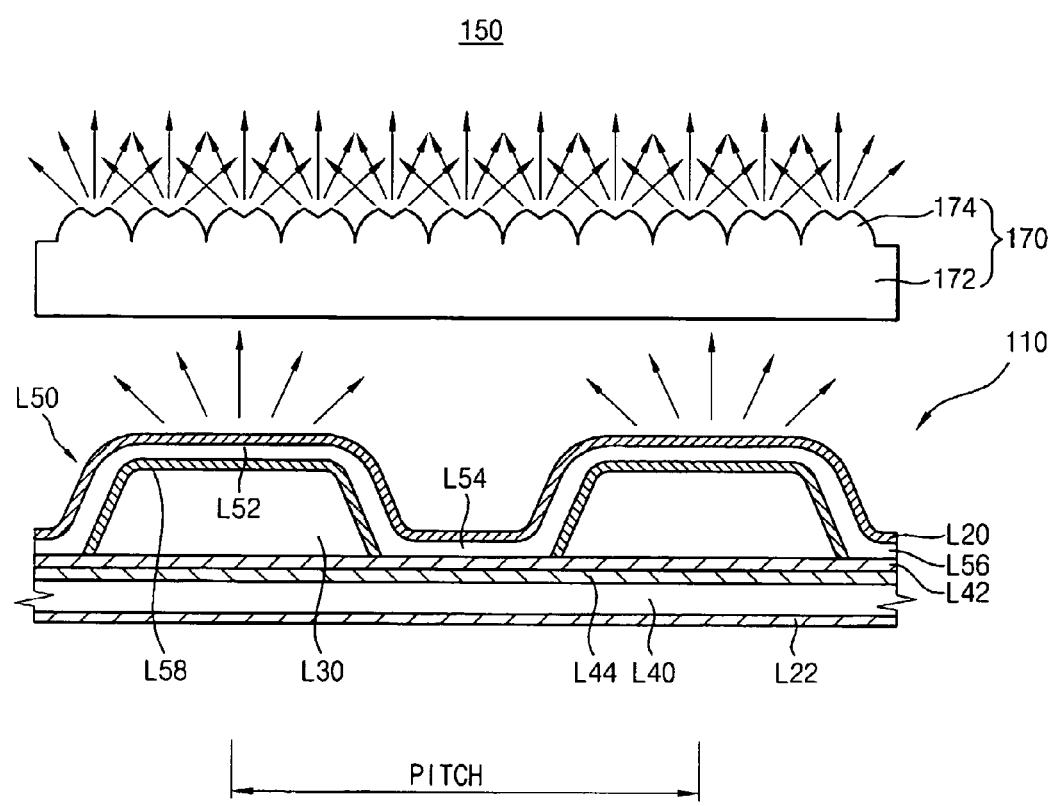
FIG. 18 is a cross sectional view illustrating a backlight assembly having the optical plate shown in FIG. 11.

FIG. 18 is a cross sectional view illustrating a backlight assembly having the optical plate shown in FIG. 11.

Referring to FIG. 18, a backlight assembly 150 of this embodiment includes a flat fluorescent lamp 110 for emitting a light, and an optical plate 170 arranged over the flat fluorescent lamp 110, to improve uniformity of the light emitted from the flat fluorescent lamp 110 and to then irradiate the light in an upward direction. The flat fluorescent lamp 110 is illustrated with reference to FIG. 9 so that any further illustrations with respect to the flat fluorescent lamp 110 are omitted herein for brevity.

As shown in FIG. 18, the optical plate 170 includes a planar base 172, and a plurality of prisms 174 each having a concave peak that is formed on the planar base 172. The optical plate 170 has a heat-resistant property. Here, an interval between the flat fluorescent lamp 110 and the optical plate 170 may be about 6.5 mm.

A relatively large amount of light is emitted in a region where the discharge spaces L30 are positioned. In contrast, a relatively small amount of light is emitted in a region where the discharge spaces L30 are not positioned. As a result, the bright lines are generated in the region where the relatively large amount of light is emitted. On the other hand, the dark fields are generated in the region where the relatively small amount of light is emitted.

However, the prisms having the concave peak of the optical plate 170 in accordance with the present invention enhance the diffusion of the light. As a result, the generation of the bright lines and the dark fields on the optical plate 170 may be suppressed. Further, a luminance difference between the bright lines and the dark fields may be reduced.

In this embodiment, the optical plate having the prism array shape that has the concave peak is employed in the backlight assembly having the flat fluorescent lamp. Alternatively, it will be apparent to persons of ordinary skill in the art that the optical plate having the prism array shape that has the concave peak may be employed in a direct illumination type backlight assembly, a backlight assembly having a plurality of light-emitting diodes, etc.

Figure 19:
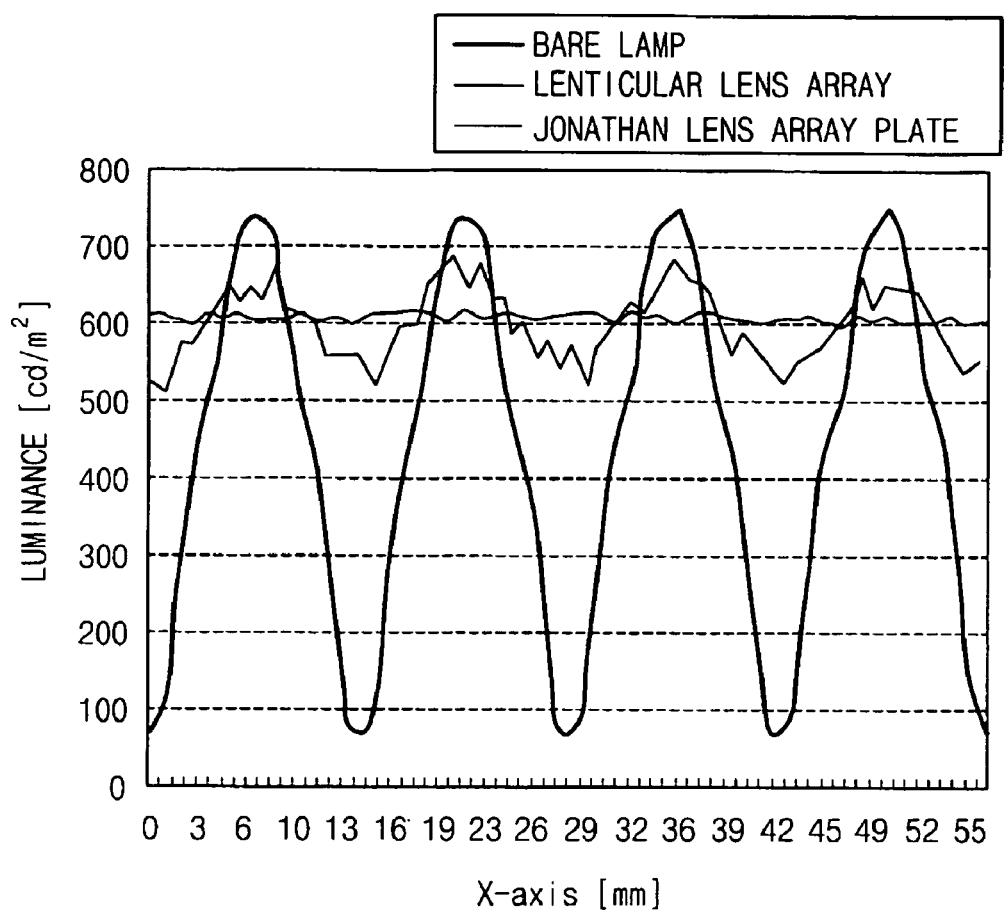
FIG. 19 is a graph illustrating optically analyzed results obtained by applying the optical plate that includes prism arrays having concave peaks to a flat fluorescent lamp.

FIG. 19 is a graph illustrating optically analyzed results obtained by applying the optical plate that includes the prism array shape having the concave peak, which have concave peaks, to a flat fluorescent lamp.

Referring to FIG. 19, a lenticular lens array type general optical plate diffuses a backlight having a luminance of about 80 cd/m$^2$ to about 750 cd/m$^2$ to provide the backlight with a luminance of about 520 cd/m$^2$ to about 680 cd/m$^2$. The lenticular lens array type optical plate is proposed for reducing the thickness a backlight assembly. The lenticular lens has a semi-circular shape protruded toward a viewer to diffuse an image, thereby providing the viewer with a viewing angle of about 180° centering around a screen.

In contrast, the optical plate having the rounded prism array shape diffuses a backlight having a luminance of about 80 cd/m$^2$ to about 750 cd/m$^2$ to provide the backlight with a luminance of about 580 cd/m$^2$ to about 610 cd/m$^2$. The optical plate is referred to as a Jonathan lens array plate.

Therefore, the optical plate having the rounded prism array shape may have improved light-diffusing efficiency, better than that of the lenticular lens array type optical plate.

Figure 20:
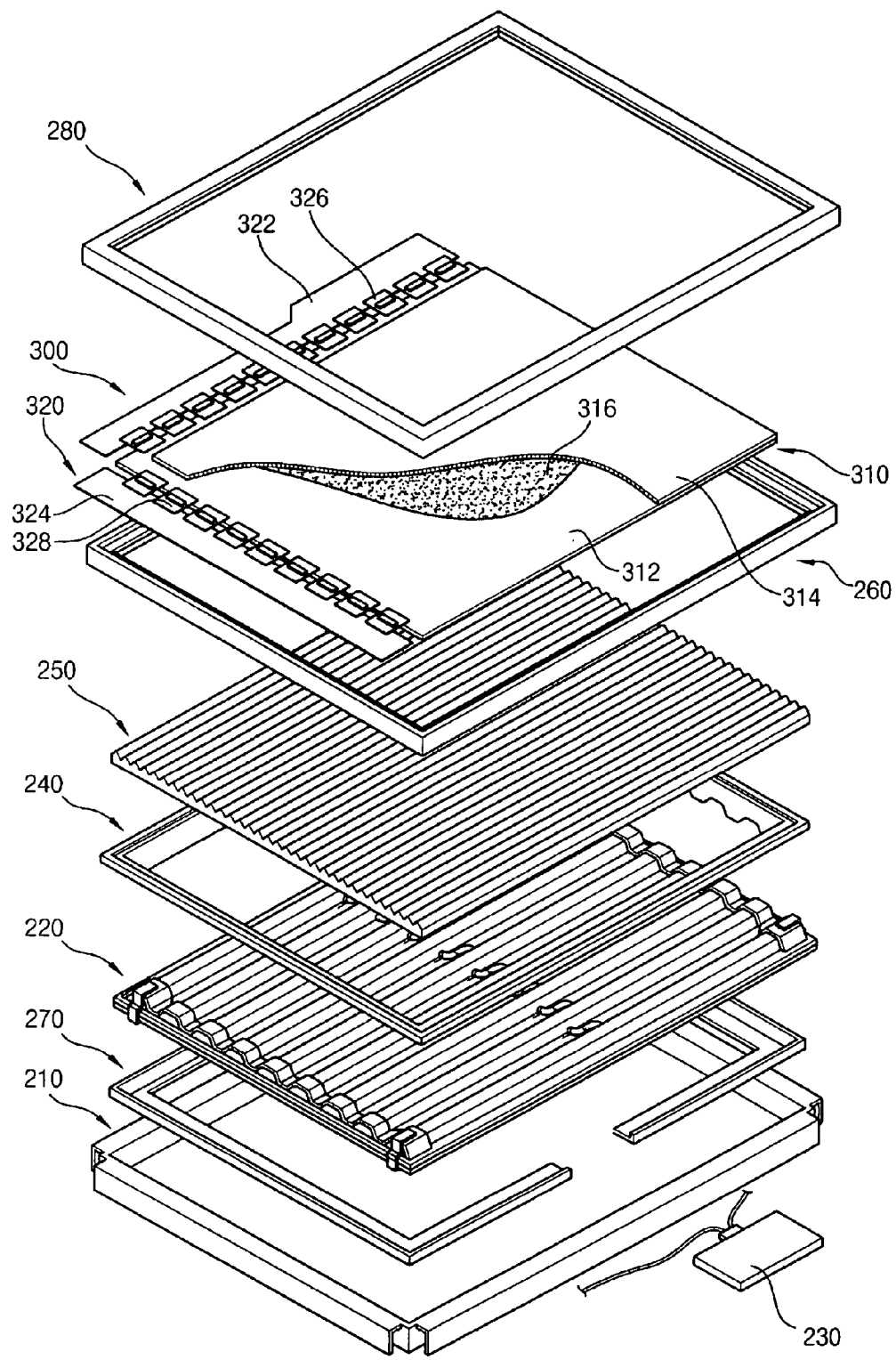
FIG. 20 is an exploded perspective view illustrating a liquid crystal display (LCD) device in accordance with an exemplary embodiment of the present invention.

FIG. 20 is an exploded perspective view illustrating a liquid crystal display (LCD) device in accordance with an embodiment.

Referring to FIG. 20, an LCD device of this embodiment includes a container 210, a flat fluorescent lamp 220, an inverter 230 and a display unit 300.

The container 210 has a receiving space for receiving the flat fluorescent lamp 220.

The flat fluorescent lamp 220 includes a lamp body having a plurality of discharge spaces to emit a light, an outer electrode formed on both ends of the lamp body in a direction substantially perpendicular to a lengthwise direction of the discharge space, and an auxiliary electrode combined with the lamp body and making contact with the outer electrode.

Particularly, the lamp body has a rectangular shape on a plan view to emit a planar light. When a discharge voltage is applied to the outer electrode from the inverter 230, plasma discharge is generated in the discharge spaces of the lamp body to generate an UV ray. The UV ray is converted into a visible light. The visible light exits through the lamp body.

Here, the lamp body has a wide light-emitting area. Thus, to improve light-emitting efficiency and luminance uniformity, an internal space in the lamp body is divided into the discharge spaces. The lamp body includes a first substrate and a second substrate. The first and second substrates are combined with each other to form the discharge spaces.

The inverter 230 generates the discharge voltage for emitting the light from the flat fluorescent lamp 220.

The display unit 300 includes an LCD panel 310 for displaying an image using the light provided from the flat fluorescent lap 220, and a driving circuit 320 for driving the LCD panel 310.

The LCD panel 310 includes a first substrate 312, a second substrate 314 facing the first substrate and combined with the first substrate 312, and a liquid crystal (LC) layer 316 interposed between the first and second substrates 312 and 314.

The first substrate 312 corresponds to a thin-film transistor (TFT) substrate on which TFTs as switching elements are arranged in a matrix pattern. For example, the first substrate 312 includes a glass. The TFTs include a source terminal electrically connected to a data line, a gate terminal electrically connected to a gate line, and a drain terminal electrically connected to a pixel electrode (not shown) including a transparent conductive material.

The second substrate 314 corresponds to a color filter substrate on which RGB pixels for forming colors are arranged in a thin-film shape. For example, the second substrate 314 includes a glass. A common electrode (not shown) including a transparent conductive material is formed on the second substrate 314.

When power is applied to the gate terminal of the TFT, the TFT is turned on so that an electric field is generated between the pixel electrode and the common electrode. The electric field alters arrangements of LC molecules in the LC layer 316 interposed between the first and second substrates 312 and 314. A transmissivity of the light provided from the flat fluorescent lamp 220 is changed in accordance with the arrangement alteration of the LC molecules to display an image having a desired gradation.

The driving circuit 320 includes a data printed circuit board (PCB) 322 for supplying a data-driving signal to the LCD panel 310, a gate PCB 324 for supplying a gate-driving signal to the LCD panel 310, a data flexible printed circuit board (FPC) 326, and a gate FPC 328 connected between the gate PCB 324 and the LCD panel 310. For example, the data FPC 326 and the gate FPC 328 include a tape carrier package (TCP), a chip-on-film (COF), etc.

The data PCB 322 is arranged at a side face or a rear face of the container 210 by bending the data FPC 326. The gate PCB 324 is arranged at the side face or the rear face of the container 210 by bending the gate FPC 328. Alternatively, when a separate signal line is provided to the LCD panel 310 and the gate FPC 328, the gate PCB 324 may be omitted.

The LCD device may further include an optical plate 250 positioned over the flat fluorescent lamp 220. The optical plate 250 diffuses the light emitted from the flat fluorescent lamp 220 to improve luminance uniformity of the light. The optical plate 250 has a plate shape including a rounded prism array shape. The optical plate 250 is spaced apart from the flat fluorescent lamp 220. The optical plate 250 includes a transparent material for allowing the light to pass through the optical plate 250. The optical plate 250 may further include a light-diffusing agent for diffusing the light. An example of the optical plate 250 includes PMMA.

The LCD device may further include a middle mold 240 arranged between the flat fluorescent lamp 220 and the optical plate 250. The middle mold 240 is assembled with the container 210 with the flat fluorescent lamp 220 being interposed between the middle mold 240 and the container 210 to fix the flat fluorescent lamp 220. The middle mold 240 secures an edge of the flat fluorescent lamp 220 to cover a region, which does not emit the light, where the outer electrode is positioned. Further, the middle mold 240 supports an edge of the optical plate 250. For example, the middle mold 240 has a rectangular frame formed as one body. Alternatively, the middle mold 240 may include a first piece having a U-shape and a second piece having an I-shape or two pieces having an L-shape. Further, the middle mold 240 may include four pieces having an I-shape.

Here, the middle mold 240 may include a plastic (hereinafter, referred to as a heat-dissipating plastic) having a thermal conductivity of no less than about 20 W/mK. For example, an example of the heat-dissipating plastic includes CoolPoly (a product name produced by Cool Polymers, Inc.). CoolPoly is a thermally conductive plastic having a thermal conductivity of about 10 W/mK to about 100 W/mK. Here, W, m and K indicate Watts, meters and Kelvin, respectively.

The LCD device may further include an upper mold 260. The upper mold 260 is arranged between the optical plate 250 and the LCD panel 310. The upper mold 260 secures the edge of the optical plate 250 and also supports an edge of the LCD panel 310. The upper mold 260 may have a shape substantially the same as that of the middle mold 240. Thus, the upper mold 260 may have a rectangular frame formed as one body, two pieces having a U-shape and an I-shape, respectively, two pieces having an L-shape or four pieces having an I-shape.

The LCD device may further include a buffering member 270 interposed between the container 210 and the flat fluorescent lamp 220. The buffering member 270 supports the flat fluorescent lamp 220. The buffering member 270 is arranged along the edge of the flat fluorescent lamp 220. Thus, a gap is formed between the flat fluorescent lamp 220 and the container 210 due to the buffering member 270 to prevent electrical contact between the flat fluorescent lamp 220 and the container 210. To provide the buffering member 270 with the above-mentioned function, the buffering member 270 includes an insulation material. Further, to absorb impacts applied to the LCD device, the buffering member 270 may have an elastic material.

For example, the buffering member 270 includes silicone. Further, the buffering member 270 includes two pieces having a U-shape.

Alternatively, the buffering member 270 may include four pieces corresponding to four sides of the flat fluorescent lamp 220, four pieces corresponding to four corners of the flat fluorescent lamp 220 or a frame as one body.

The LCD device may further include a top chassis 280 for securing the display unit 300. The top chassis 280 is combined with the container 210 to secure the edge of the LCD panel 310. Here, the data PCB 322 is bent using the data FPC 326 and is then secured to a side face or a bottom face of the container 210. An example of the top chassis 280 includes a metal having high strength and good deformation resistance.

Figure 21:
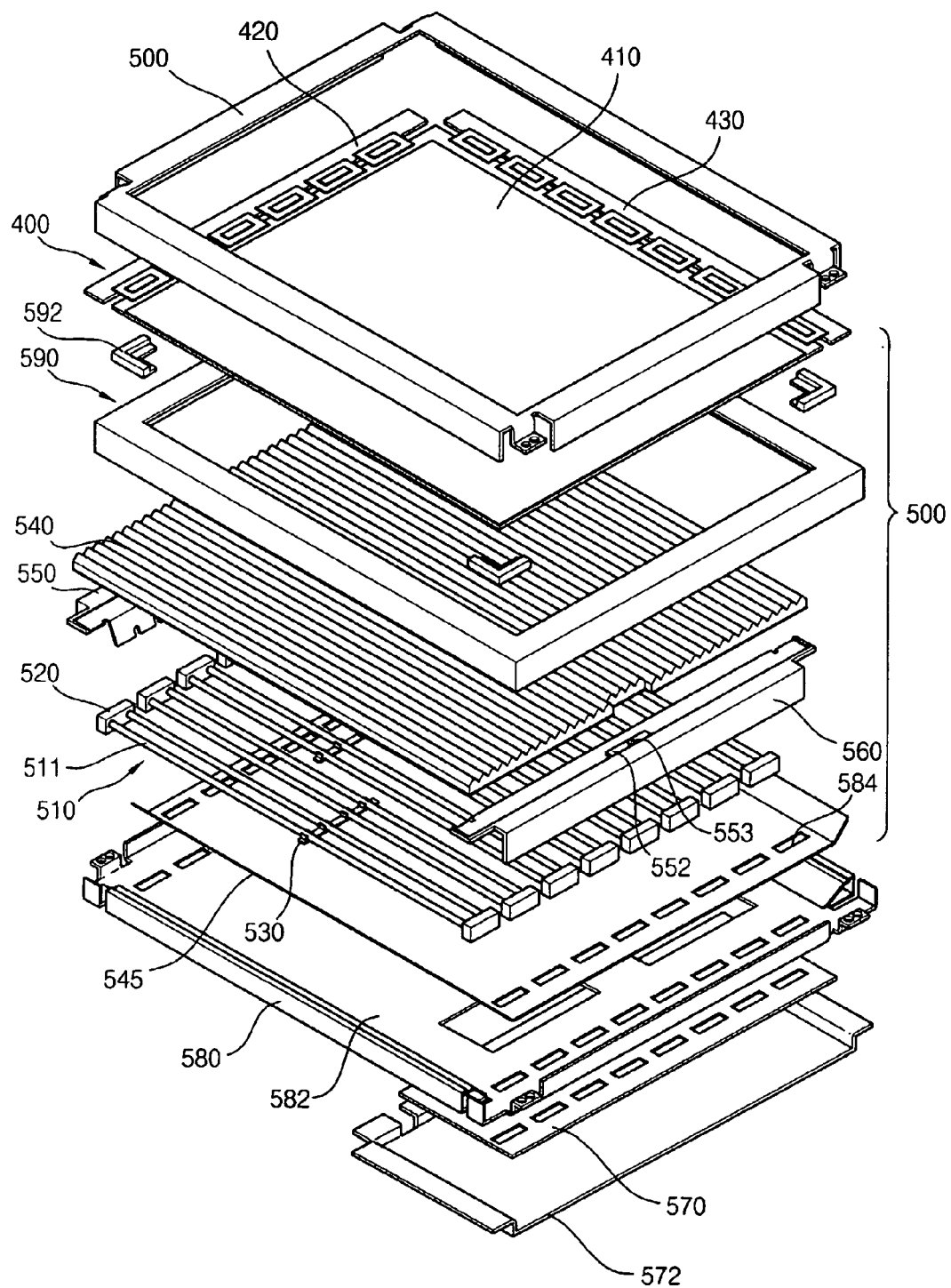
FIG. 21 is an exploded perspective view illustrating an LCD device in accordance with an exemplary embodiment of the present invention.

FIG. 21 is an exploded perspective view illustrating an LCD device in accordance with an embodiment of the present invention.

Referring to FIG. 21, an LCD device of this embodiment includes a display unit 400, a backlight assembly 500 positioned under the display unit 400 to provide the display unit 400 with a light, and a container 580 for receiving the display unit 400 and the backlight assembly 500.

The display unit 400 includes a display panel 410 for displaying an image, and a gate PCB 420 and a data PCB 430 for driving the display panel 410. The display panel 410 includes a first substrate (not shown), a second substrate (not shown) facing the first substrate, and an LC layer (not shown) interposed between the first and second substrates.

The first substrate corresponds to a transparent glass substrate on which TFTs as switching elements are arranged in a matrix pattern. The TFTs include a source terminal electrically connected to a data line, a gate terminal electrically connected to a gate line, and a drain terminal electrically connected to a pixel electrode including a transparent conductive material.

The second substrate is arranged facing the first substrate. The second substrate corresponds to a color filter substrate on which RGB pixels for forming colors are formed by a thin film-forming process. A common electrode including indium tin oxide is formed on the second substrate.

When a power is applied to the gate terminal of the TFT, the TFT is turned on so that an electric field is generated between the pixel electrode and the common electrode. The electric field alters arrangements of LC molecules in the LC layer interposed between the first and second substrates. A transmissivity of the light is changed in accordance with the arrangement alteration of the LC molecules to display an image having a desired gradation.

The backlight assembly 500 includes a lamp unit 510 having a plurality of lamps 511 for emitting the light, a lamp holder 520 for fixing the lamps 511, and an optical plate 540 for diffusing the light emitted from the lamp unit 510 to improve luminance uniformity of the light and a viewing angle and for irradiating the light to the display unit 400. The optical plate 540 includes elements substantially the same as those in FIGS. 2 to 5. Thus, any further illustrations with respect to the optical plate 540 are omitted herein for brevity.

In this example embodiment, the lamp unit 510 includes the bar-shaped lamps 511 arranged in parallel. Alternatively, a lamp having a U-shape may be employed in the lamp unit 510. Additionally, a reflection plate (not shown) may be arranged under the lamp unit 510.

Further, examples of the lamps 511 include a cold cathode fluorescent lamp having an internal electrode, an external electrode lamp, etc. Alternatively, an LED may be used as a light source in place of the lamp unit 510.

An inverter 570 applies a driving signal to the lamp unit 510. The inverter 570 may include a PCB. An inverter cover 572 includes a metal for preventing electromagnetic interference, which is generated from the inverter 570, from being radiated.

The lamp holder 520 surrounds the electrode of the lamp 511. The lamp holder 520 is combined with the container 580 to prevent the lamp 511 from being moved. To assemble the container 580 and a reflection sheet 545 with the lamp holder 520, fixing holes are formed through the container 580 and the reflection sheet 545.

The reflection sheet 545 is positioned under the lamp unit 510. The reflection sheet 545 reflects the light emitted from the lamp unit 510 toward the LCD panel 410. Holes 584 corresponding to the lamp holder 520 are formed through the reflection sheet 545.

A lamp-fixing member 530 fixes the lamps 511 to provide the lamps 511 with a uniform interval. The lamp-fixing member 530 may further include a supporting portion for supporting the optical plate 540 to provide the optical plate 540 and the lamp unit 510 with a gap. The lamp-fixing member 530 is combined with the container 580 through the holes 584 of the reflection sheet 545.

The backlight assembly 500 further includes a first side mold 550 and a second side mold 560. The first and second side molds 550 and 560 are assembled with the container 580 to receive both ends of the lamp unit 510.

The optical plate 540 is placed on the first and second side molds 550 and 560. At least one of the first and second side molds 550 and 560 includes a movement-preventing portion 552 for preventing the optical plate 540 from being moved, and a fixing portion 553 for fixing the optical plate 540. Here, an example of the first and second side molds 550 and 560 includes a heat-dissipating plastic having a thermal conductivity of no less than about 20 W/mK.

Heat generated in the lamp unit 510 is transferred to the first and second side molds 550 and 560. The heat in the first and second side molds 550 and 560 is then transferred to the container 580.

The optical plate 540 diffuses and transmits the light irradiated from the lamp unit 510.

A middle mold 590 is combined with the container 580 to prevent the optical plate 540 from being moved. The display panel 410 is placed on the middle mold 590. The middle mold 590 further includes a panel-guiding member 592 for guiding assembly positions of the display panel 410. The panel-guiding member 592 may include an elastic material such as a rubber. Alternatively, the panel-guiding member 592 may be integrally formed with the middle mold 590. The panel-guiding member 592 may be positioned on corners of the middle mold 590.

The container 580 has a bottom face and side faces for defining a receiving space in which the display panel 410 and the backlight assembly 500 are received. The container 580 may include a metal.

A top chassis 500 is combined with the container 580 to fix the display unit 400 and the backlight assembly 500.

Figure 22:
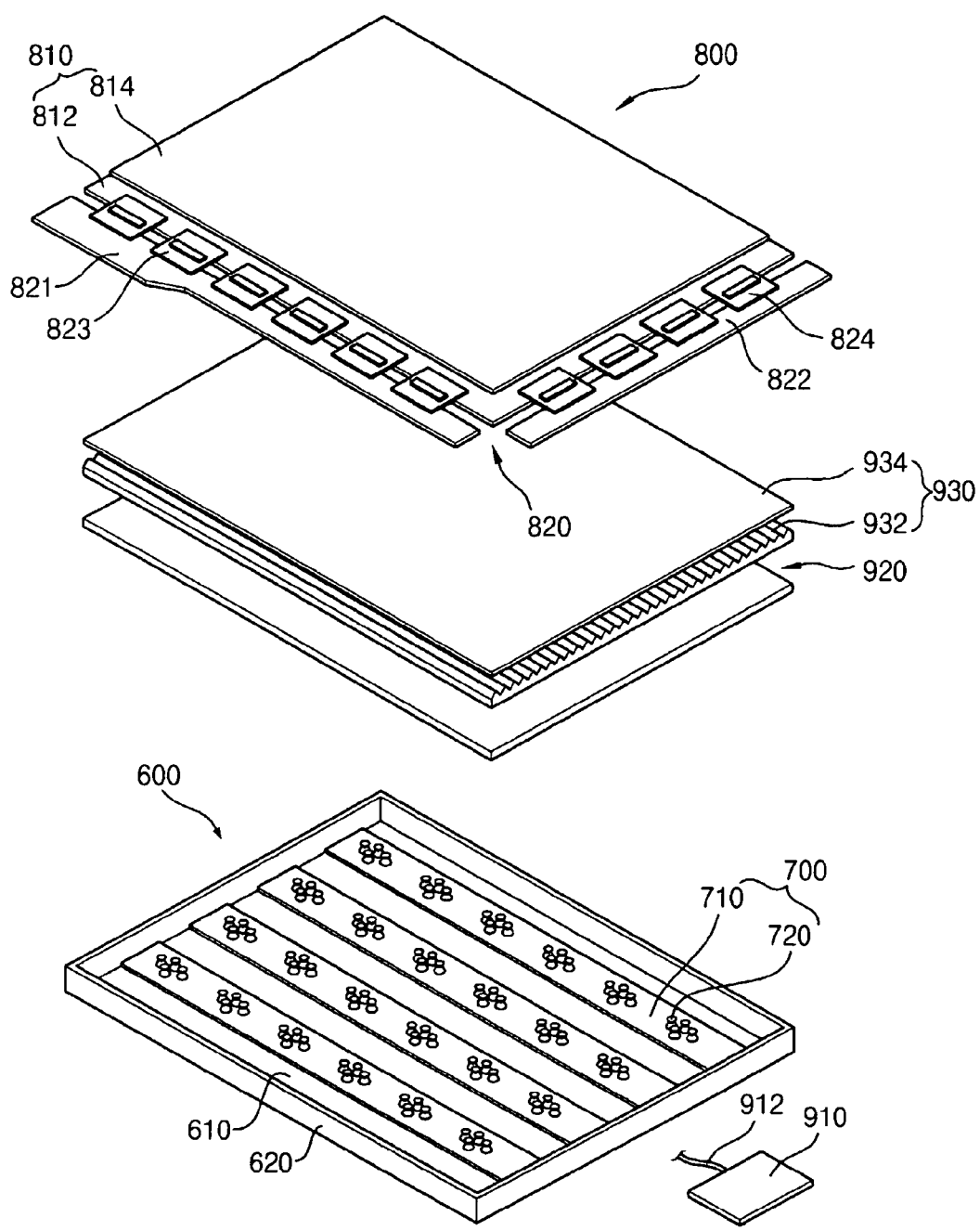
FIG. 22 is an exploded perspective view illustrating an LCD device in accordance with an exemplary embodiment of the present invention.

FIG. 22 is an exploded perspective view illustrating an LCD device in accordance with an embodiment of the present invention.

Referring to FIG. 22, an LCD device of this embodiment includes a container 600, a light-emitting apparatus 700 and a display unit 800.

The container 600 includes a bottom face 610 and side faces 620 extending from edges of the bottom faces. The bottom face 610 and the side faces 620 define a receiving space for receiving the light-emitting apparatus 700. For example, the container 600 includes a metal having high strength and good deformation-resistance.

The light-emitting apparatus 700 for emitting a light is positioned on the bottom face 610 of the container 600. To uniformly emit the light to a wide extent, a plurality of the light-emitting apparatuses 700 is arranged on the bottom face 610 of the container 600. Further, the light-emitting apparatuses 700 are arranged in parallel with each other and spaced apart from each other by a same interval. Here, point light source units 720 on a circuit substrate 710 are arranged in a zigzag pattern between the adjacent light-emitting apparatuses 700. That is, a point light source unit 720 in one light-emitting apparatus 700 is positioned between point light source units 720 in adjacent light-emitting apparatuses 700.

Alternatively, the light-emitting apparatus 700 may have a structure that includes the point light source units 720 arranged in rows on the single circuit substrate 710. Further, the circuit substrate 710 may be arranged outside of the container 600 and only the point light source units 720 may be installed in the container 600.

The display unit 800 includes a display panel 810 for displaying an image using the light emitted from the light-emitting apparatus 700, and a driving circuit 820 for driving the display panel 810.

The display panel 810 includes a first substrate 812, a second substrate 814 combined with the first substrate 812, and an LC layer (not shown) interposed between the first and second substrates 812 and 814. The second substrate 814 faces the first substrate 812.

The first substrate 812 corresponds to a TFT substrate on which TFTs as switching elements are arranged in a matrix pattern. For example, the first substrate 812 includes a glass. The TFTs include a source terminal electrically connected to a data line, a gate terminal electrically connected to a gate line, and a drain terminal electrically connected to a pixel electrode (not shown) including a transparent conductive material.

The second substrate 814 corresponds to a color filter substrate on which RGB pixels for forming colors are arranged in a thin-film shape. For example, the second substrate 814 includes a glass. A common electrode (not shown) including a transparent conductive material is formed on the second substrate 814.

When power is applied to the gate terminal of the TFT, the TFT is turned on so that an electric field is generated between the pixel electrode and the common electrode. The electric field alters arrangements of LC molecules in the LC layer (not shown) interposed between the first and second substrates 812 and 814. A transmissivity of the light provided from the light-emitting apparatus 700 is changed in accordance with the arrangement alteration of the LC molecules to display an image having a desired gradation.

The driving circuit 820 includes a data PCB 821 for supplying a data-driving signal to the LCD panel 810, a gate PCB 822 for supplying a gate-driving signal to the LCD panel 810, a data FPC 823, and a gate FPC 824 connected between the gate PCB 822 and the LCD panel 810. For example, the data FPC 823 and the gate FPC 824 include a tape carrier package (TCP), a chip-on-film (COF), etc. Alternatively, when a separate signal line is provided to the LCD panel 810 and the gate FPC 824, the gate PCB 822 may be omitted.

The LCD device of this embodiment further includes a power supply 910 for generating a driving voltage that is applied to the light-emitting apparatus 700 to emit the light. The driving voltage generated from the power supply 910 is applied to the light-emitting apparatus 700 through a cable 912.

The LCD device may further include a light-guiding plate 920 positioned over the light-emitting apparatus 700. The light-guiding plate 920 is spaced apart from the light-emitting apparatus 700. The light-guiding plate 920 mixes a red light, a blue light and a green light generated from the light-emitting apparatus 700 to transmit a white light. An example of the light-guiding plate 920 includes PMMA.

The LCD device may further include an optical member 930 positioned over the light-guiding plate 920. To completely mix the red light, the blue light and the green light, the optical member 930 is spaced apart from the light-guiding plate 920. The optical member 930 includes an optical plate 932 for diffusing a light that exits from the light-guiding plate 920, and an optical sheet 934 placed over the optical plate 932.

The optical plate 932 diffuses the light exiting from the light-guiding plate 920 to improve luminance uniformity of the light. The optical plate 932 may have a plate shape. An example of the optical plate 923 includes PMMA. In addition, the optical plate 932 may include a diffusing agent for facilitating the diffusion of the light.

The optical sheet 934 again alters a path of the diffused light passing through the optical plate 932 further improve the luminance uniformity of the light. The optical sheet 934 may include a condensing sheet for condensing the diffused light toward a front direction to improve a front luminance of the light. The optical sheet 934 may further include a diffusion sheet for once more diffusing the diffused light passing through the optical plate 932.

The LCD device may further include optical sheets having various functions in accordance with desired luminance characteristics.

According to the present invention, the convex lens array having the rounded prism shape is formed at the light-exiting face of the optical plate. The convex lens array scatters the light from the rear face of the optical plate so that the light efficiency may be improved, and the generation of the dark fields and the bright lines is suppressed.

Further, the convex lens array having the prism shape that has the concave peak is formed at the light-exiting face of the optical plate. The concave peak scatters the light from the rear face of the optical plate so that the light efficiency may be improved along with suppressing the generation of the dark fields and the bright lines.

Furthermore, a distance between the light source and the optical plate may be shortened by light splitting that is achieved through an effective and optimal structure so that the backlight assembly and the LCD device may have a reduced thickness.

Having described the embodiments of the present invention and its advantages, it is noted that various changes, substitutions and alterations can be made herein without departing from the spirit and scope of the invention as defined by appended claims.

What is claimed is:

1. An optical plate comprising:
a planar base; and
a plurality of rounded prisms formed at a surface of the planar base, wherein each of the plurality of rounded prisms comprises two inclined curved faces and two planar faces between the two inclined curved faces, the two planar faces defining a concave portion.

2. The optical plate of claim 1, wherein the planar base has a refractive index substantially the same as a refractive index of each of the plurality of rounded prisms.

3. The optical plate of claim 1, wherein the planar base has a thickness of about 1 mm to about 3 mm.

4. The optical plate of claim 1, wherein each of the plurality of rounded prisms has side surfaces formed at an inclined angle of about 43° to about 47°.

5. The optical plate of claim 1, wherein the plurality of rounded prisms are adjacent to each other.

6. The optical plate of claim 1, wherein each of the plurality of rounded prisms has a height of about 50 μm.

7. The optical plate of claim 1, further comprising a UV-blocking layer fainted beneath a rear face of the planar base.

8. The optical plate of claim 1, further comprising UV-blocking particles formed in the planar base to block light having a high energy wavelength present in light provided to the rear face of the planar base.

9. The optical plate of claim 1, wherein the planar base includes light-scattering particles.

10. The optical plate of claim 1, wherein the concave portion is formed at a peak of the prism.

11. The optical plate of claim 1, wherein the concave portion extends in a direction substantially parallel with an extending direction of each of the plurality of rounded prisms.

12. The optical plate of claim 1, wherein each of the plurality of rounded prisms has a semi-circular cross-sectional shape that is protruded from the planar base and has a radius of about 25 μm to about 150 μm.

13. The optical plate of claim 1, wherein each of the plurality of rounded prisms has a semi-circular cross-sectional shape that is protruded from the planar base, and the concave portion has an interior angle of about 60° to about 160°.

14. The optical plate of claim 1, wherein each of the plurality of rounded prisms has a semi-circular cross-sectional shape that is protruded from the planar base, and the concave portion has a depth of about 0.1 times to about 0.7 times a radius of the semi-circular shape.

15. The optical plate of claim 1, wherein the plurality of rounded prisms on the planar base has a pitch of about 50 μm to about 300 μm.

16. The optical plate of claim 1, wherein each of the plurality of rounded prisms has a refractive index higher than a refractive index of the planar base.

17. The optical plate of claim 1, wherein each of the plurality of rounded prisms comprises rounded regions between the inclined curved faces and the planar faces.

18. A backlight assembly comprising:
a light source unit; and
an optical plate on the light source unit, wherein the optical plate includes a planar base and a plurality of rounded prisms formed at a surface of the planar base, wherein each of the plurality of rounded prisms comprises two inclined curved faces and two planar faces between the two inclined curved faces, the two planar faces defining a concave portion.

19. The backlight assembly of claim 18, wherein the optical plate has a heat-resistant quality.

20. The backlight assembly of claim 18, wherein the light source unit comprises a flat light source unit, and the optical plate is spaced apart from an upper surface of the flat light source unit by no less than about 6.5 mm.

21. The backlight assembly of claim 18, wherein the light source unit comprises a plurality of lamps, and the optical plate is spaced apart from the lamps by no less than about 6.5 mm.

22. The backlight assembly of claim 18, wherein the plurality of rounded prisms extend in a direction substantially parallel with an arrangement direction of light emitting elements of the light source unit.

23. The backlight assembly of claim 18, wherein the concave portion is formed at a peak of each prism.

24. The backlight assembly of claim 18, wherein the concave portion extends in a direction substantially parallel with an extending direction of each of the plurality of rounded prisms.

25. The backlight assembly plate of claim 18, wherein each of the plurality of rounded prisms comprises rounded regions between the inclined curved faces and the planar faces.

26. A display apparatus comprising:
a display panel;
a light source unit arranged under the display panel; and
an optical plate on the light source unit, wherein the optical plate includes a planar base and a plurality of rounded prisms formed at a surface of the planar base, wherein each of the plurality of rounded prisms comprises two inclined curved faces and two planar faces between the two inclined curved faces, the two planar faces defining a concave portion.

27. The backlight assembly of claim 26, wherein the light source unit comprises a flat fluorescent lamp facing a rear face of the display panel.

28. The backlight assembly of claim 26, wherein the light source unit comprises a plurality of lamps facing a rear face of the display panel.

29. The backlight assembly of claim 28, further comprising a reflection plate placed under the plurality of lamps.

30. The backlight assembly of claim 26, wherein the planar base is transparent.

* * * * *